US007493757B2

(12) United States Patent
Kurz et al.

(10) Patent No.: US 7,493,757 B2
(45) Date of Patent: Feb. 24, 2009

(54) HYDRAULIC PRESSURE SUPPLY UNIT

(75) Inventors: Manfred Kurz, Altenstadt (DE); Bertold Grimmer, Weilheim (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 188 days.

(21) Appl. No.: 11/588,352

(22) Filed: Oct. 27, 2006

(65) Prior Publication Data

US 2007/0095060 A1 May 3, 2007

(30) Foreign Application Priority Data

Oct. 28, 2005 (AT) ............................ GM742/2005

(51) Int. Cl.
*F16D 31/02* (2006.01)
*F15B 11/08* (2006.01)

(52) U.S. Cl. .......................................... 60/476; 60/430

(58) Field of Classification Search .................. 60/375, 60/430, 473, 476, 486, 494; 91/420
See application file for complete search history.

(56) References Cited

U.S. PATENT DOCUMENTS 3,864,911 A 2/1975 Gellatly et al.
3,903,698 A * 9/1975 Gellatly et al. ................ 60/476
4,008,571 A * 2/1977 Evans .......................... 60/486
4,184,331 A * 1/1980 Bentley ........................ 60/486
4,961,316 A * 10/1990 Corke et al. .................. 60/476
5,179,836 A * 1/1993 Dantlgraber ................. 60/486
6,886,332 B2 5/2005 Kubinski et al.

* cited by examiner

*Primary Examiner*—Michael Leslie
(74) *Attorney, Agent, or Firm*—Dykema Gossett PLLC

(57) ABSTRACT

A hydraulic pressure supply unit has two exits that are alternately pressurized, a reversible pumping unit including at least two pumps, reversible electric motor that drives all pumps jointly, if necessary with mutually de-locking check valves before the exits, and a supply for hydraulic medium. One pump is a low-pressure pump and one pump is a high-pressure pump, and the pressurized exits of both pumps are placed against the same exit of the pressure supply unit. Both exits of the high-pressure pump can be separated from the low-pressure pump via check valves, and each pump is connected to the supply for hydraulic medium via its own shuttle valve. Both exits of low-pressure pump can be connected to a tank via pressure on-off valves, and the control connections of pressure on-off valves are connected to the exits of the high-pressure pump in such a way that the control connection of that pressure on-off valve on the currently pressurized side is applied with pressure by the currently pressurized exit of the high-pressure pump.

9 Claims, 1 Drawing Sheet

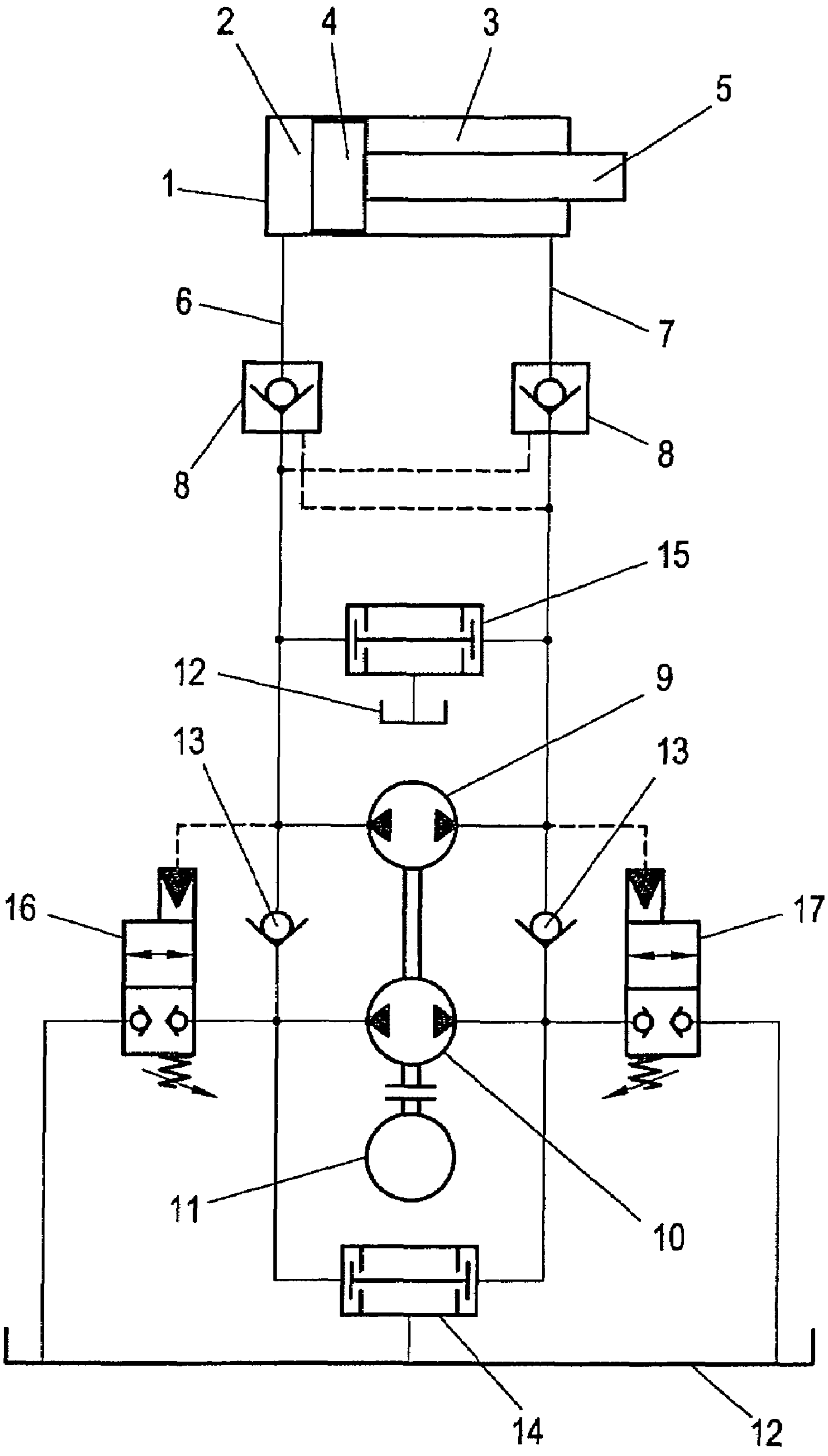
Fig.

HYDRAULIC PRESSURE SUPPLY UNIT

BACKGROUND OF THE INVENTION

1. Field of the Invention

The invention relates to a hydraulic pressure supply unit with two exits that are alternately pressurized, with a reversible pumping unit comprising at least two pumps as well as a reversible electric motor that drives all pumps jointly, if necessary with mutually de-locking check valves before the exits and with a supply for hydraulic medium, and whereby one pump is configured as a low-pressure pump and one pump is configured as a high-pressure pump, and whereby the pressurized exits of both pumps are placed against the same exit of the pressure supply unit; moreover, the invention relates to an electrohydraulic work unit comprising a double-acting hydraulic working cylinder, an electrohydraulic pressure supply unit for the alternate application of pressure to, respectively, one working chamber of the working cylinder, as well as a connection for the external power supply.

2. The Prior Art

A multitude of applications involving hydraulic systems requires that a user with two connections is supplied alternately at the one or the other connection with hydraulic medium. For example, a hydraulic working cylinder is frequently envisioned as user, both working chambers of which are alternately to be applied with pressure. This alternate application of pressure can be effected, on the one hand, via switchover valve arrangements but also more simply via reversible pump arrangements. Systems of this kind are known, for example, from DE 197 16 081 C1 and experience far-spread use.

For many applications of hydraulic systems it is required that at certain times and under certain conditions the pressure assumes different levels, which means a working cylinder that may be connected in fact exercises different forces. For example, for the largest part of the expansion stroke of the working cylinder the required force is often quite small, but a quick movement is desired. As soon as the load is taking effect, the working cylinder must be moved with high force, and herein the path of the load often only constitutes a minimal part of the total expansion stroke. U.S. Pat. No. 6,886,332 B2 discloses a system of the kind as described at the outset; but here only one side of the pressure supply unit [Translator's note: typo in the source text: 'Druckverborgungseinheit' (does not exist) should be 'Druckversorgungseinheit' (pressure supply unit)] offers the desired functionality of a two-level operation. The two connections of the pressure supply unit are no longer independent between the two pumps, due to the control line for the de-lockable check valve that is provided only on one side of the pumping arrangement. In addition, both pumps are supplied via the same line from the tank. A similar system is also described in U.S. Pat. No. 3,864,911.

The object of the present invention is therefore to provide a pressure supply unit that allows for making available a large quantity of hydraulic medium until a pressure level is reached that can be preset, while, after reaching this pressure level, hydraulic medium at high pressure can be made available, and whereby this function is fulfilled at two exits that are easily alternately pressurized. A further object was to provide a hydraulic work unit the working cylinder of which is easily reversible and can initially be moved quickly in both directions, and the working cylinder exercises thereafter a high force, when the load is increased, and whereby the load can also be applied in a stationary manner.

SUMMARY OF THE INVENTION

In order to solve the first object the pressure supply unit is characterized by the fact that both exits of the high-pressure pump are separated from the low-pressure pump by check valves, and each pump is connected to the supply for hydraulic medium via its own shuttle valve; and the pressure supply unit is characterized by the fact that both exits of the low-pressure pump can be connected to the tank via pressure on-off valves, and herein the control connections of the pressure on-off valves are connected to the exits of the high-pressure pump in such a way that the control connection of that particular pressure on-off valve on the currently pressurized side is applied with pressure by the currently pressurized exit of the high-pressure pump. With this connection, the pressure supply unit provides for both exits of the apparatus the flow rate for both pumps of hydraulic medium until the pressure level that can be preferably set within the system is reached and at which point the pressure on-off valve is triggered. At this point then, the low-pressure pump is switched off, and the consumer is then only supplied by the flow rate of the high-pressure pump. This functionality can be achieved easily, while avoiding reversing valves, by way of simple reversing of the direction of rotation of the pumps at both exits of the pressure supply unit, and whereby the check valves between the different pressure levels of the pressure supply unit on both sides of the pumps operate independently of the respectively other side. This way, the highest possible independence, and thereby flexibility, is achieved for the design of the pressure supply unit on both sides. In addition, the electric motor that is used for driving the pumps can be designed just for the desired highest system pressure, i.e. for the high-pressure pump, because at lower pressure levels it is possible to make due even when both pumps operate in a parallel way with the same motor.

According to an advantageous embodied example of the invention it is envisioned that at least one, preferably both, of the pressure on-off valve has/have an adjustable switching point that is independent of the other pressure on-off valve. This allows for adjusting different characteristics at both exits.

Preferably, the pumps are configured as fixed displacement pumps, which simplifies the system considerably both with regard to manufacturing as well as operation.

In order to arrive at an as much as possible self-sufficient unit, it can be envisioned in accordance with another characteristic of the invention that a tank for the hydraulic medium is integrated in the pressure supply unit and that each pump is connected by its own shuttle valve for the pressure-tank-switchover.

To solve the second object of the invention, an electrohydraulic work unit with a double-acting hydraulic working cylinder the working chambers of which are alternately pressurized is characterized by the fact that the pressure supply unit is configured in accordance with one of the previous paragraphs and each working chamber of the working cylinder is connected always to the same exit of the pressure supply unit. This way, it is possible to achieve by simple triggering, while foregoing complicated reversing valve arrangements, and with a compact configuration of the working cylinder a fast rapid traverse by initially supplying hydraulic medium via both pumps jointly, whereby subsequently a high force level is reached, when, due to the increase of the load on the working cylinder, the pressure level increases to the point that the low-pressure pump is switched off. The flow rate is then reduced to the quantity that is provided by the high-pressure pump.

A special embodied example of the invention provides that the working cylinder is configured as a differential cylinder. In this instance, to achieve the same characteristics with regard to vertical speed and force levels in both directions of movement of the working cylinder, a correspondingly diametrically opposed setting of the switching points of the pressure on-off valves may be advantageous.

A further embodied example according to the invention envisions that the working cylinder is configured as a synchronizing cylinder with piston rods that can be extended on both sides. In this case, in a simple way, it is possible to configure the system as completely symmetrical. On the other hand, naturally, for both types of working cylinders it is possible to envision a different force/path characteristic in the different directions of movement, also based on different requirements if, for example, the exercise of a high level of force is only required in one direction.

To ensure the secure holding effect by the working cylinder during break-downs or down times of the pressure supply device and, on the other hand, to ensure the unencumbered expansion stroke, a further embodied example according to the invention envisions that check valves are provided in the connecting lines between the pumping unit of the pressure supply unit and the working chambers of the working cylinder that can be released from their locked position by the pressure in the respectively other line.

The following description shall illustrate the invention in more detail in reference to an embodiment that is depicted in the attached drawing.

BRIEF DESCRIPTION OF THE DRAWING

The FIGURE in the drawing shows the hydraulic switching diagram of an electrohydraulic work unit according to the invention of the type that may be used in the most varied kinds of practical applications.

DETAILED DESCRIPTION OF THE PREFERRED EMBODIMENT

As can be seen in the drawing, the electrohydraulic work unit comprises at least one working cylinder 1, both working chambers 2, 3 of which are alternately pressurized with hydraulic medium, in particular in such a way that piston 4 and piston rod 5 are extended and retracted. Not shown is an external power supply connection. Naturally, aside from the configuration of working cylinder 1 as a differential cylinder, other types of working cylinders 1 are possible, for example, synchronous cylinders with piston rods that can be extended on both sides. Advantageously, check valves 8 of known design are envisioned in connecting lines 6, 7 to working chamber 2, 3 of working cylinder 1 that can be unlocked by the pressure in the respectively other line 7 or 6. These check valves 8 can be envisioned as separate components in lines 6, 7 but can also be provided on working cylinder 1 itself or integrated in the subsequently described pressure supply unit.

The hydraulic pressure supply unit in the shown configuration that can advantageously be used in work units of this kind comprises two exits that are alternately applied with pressure, they are formed by lines 6, 7 or connected to these lines 6, 7. A reversible pumping unit with at least two pumps 9, 10 and a reversible electric motor 11 that drives all pumps 9, 10 jointly is provided for the pumping and the pressure build-up in the hydraulic medium of the system. The pressure supply unit can be connected either to an external supply for hydraulic medium, or it can be equipped with a tank 12 that is integrated in the unit (shown twice in the figure in order to simplify the representation); this allows the unit to be operated as best as possible in a self-sufficient manner.

It order to allow for the availability of a large quantity of hydraulic medium until a pressure level that can be preset is reached in the system, and thereby a force of working cylinder 1 is reached that can be preset which results in a rapid traverse of working cylinder 1, while, after this pressure level has been reached, hydraulic medium with high pressure can be provided, one of the pumps 10 is designed as low-pressure pump and another pump 9 is designed as high-pressure pump, and whereby the pressurized exits of both pumps 9, 10 are placed against at the same exit 6 or 7 of the pressure supply unit. Thus, the flow rates of both pumps 9, 10 are added up and much hydraulic medium is transported into working chambers 2 and/or 3, whereby piston 4 and piston rod 5 are quickly retracted or extended at small load.

High-pressure pump 9 is separated from low-pressure pump 10 by check valves 13 that lock in the direction of low-pressure pump 10. Each pump 9, 10 is also connected via its own shuttle valve 14, 15 to the supply for the hydraulic medium or tank 12.

The two exits of low-pressure pump 10 can be connected via respectively one pressure on-off valve 16, 17 to tank 12; and the control connections of pressure on-off valves 16, 17 are hereby connected to the exits of high-pressure pump 9 in such a way that the control connection of that pressure on-off valve 16, 17 on the currently pressurized side is also applied with pressure by the currently pressurized exit of high-pressure pump 9. Consequently, system pressure is applied at the respective control connection of pressure switch valve 16, 17 that is respectively present in lines 6 or 7 and that reflects the load conditions at piston rod 5 of working cylinder 1.

As soon as, for example, the load increases when the piston rod is extended, the latter brakes the stroke of working cylinder 1, and the pressure in line 6 that pressurizes working chamber 2 increases until the switching point of pressure on-off valve 16 is reached and said valve releases the connection between low-pressure pump 10 and tank 12. Thanks to check valve 13, the hydraulic medium pumped by high-pressure pump 9 cannot flow off in tank 12, but it is instead pumped further to working chamber 2 in which the higher pressure now becomes adjusted, whereby working cylinder 1 applies high force to the load.

In order to be able to take into consideration asymmetrical speed and/or load conditions on working cylinder 1 or to be able to equalize the differences of differential cylinders, preferably, at least one of pressure on-off valves 16, 17 has a switching point that is adjustable independently of the other pressure on-off valve 17, 16.

Pumps 9, 10 are preferably configured as fixed displacement pumps, and the flow rate of low-pressure pump 10 is larger or equal to the flow rate of high-pressure pump 9. The terms high-pressure pump 9 and low-pressure pump 10 must be seen in relative relation of the pressures that can be generated by pumps 9, 10 because said relation is also influenced by the motor-specific output of drive 11.

The invention claimed is:

1. A hydraulic pressure supply unit with two exits that are alternatively pressurized, with a reversible pumping unit comprising at least two pumps as well as a reversible electric motor that drives all pumps jointly and whereby one pump is a low-pressure pump and one pump is a high-pressure pump, and whereby the pressurized exits of both pumps are placed against the same exit of the pressure supply unit wherein both exits of high-pressure pump are separated from low-pressure pump by check valves, and whereby each pump is connected to the supply for hydraulic medium via its own shuttle valve, wherein both exits of low-pressure pump can be connected to a tank via pressure on-off valves, and whereby the control connection of pressure on-off valves is connected to the exits of high-pressure pump in such a way that the control connection of that pressure on-off valve on the currently pressurized side is applied with pressure by the currently pressurized exit of high-pressure pump.

2. The hydraulic pressure supply unit as claimed in claim 1, wherein at least one of the pressure on-off valves has a switching point that can be set independently of the other pressure on-off valve.

3. The hydraulic pressure supply unit as claimed in claim 1, wherein the pumps are configured as fixed displacement pumps.

4. The hydraulic pressure supply unit as claimed in claim 1, wherein the tank for the hydraulic medium is integrated in the pressure supply unit, and wherein each pump is connected to the pressure-tank-reversing via its own shuttle valve.

5. Electrohydraulic work unit comprising a double-acting hydraulic working cylinder, an electrohydraulic pressure supply unit for the alternate pressurization of respectively one working chamber of the working cylinder and a connection for the external power supply wherein the pressure supply unit is configured in accordance with claim 1, and wherein each working chamber of the working cylinder is always connected to the same exit of the pressure supply unit.

6. The electrohydraulic work unit as claimed in claim 5, wherein the working cylinder a differential cylinder.

7. The electrohydraulic work unit as claimed in claim 5, wherein the working cylinder a synchronous cylinder with piston rods that can be extended on both sides.

8. The electrohydraulic work unit as claimed in claim 5, wherein check valves that are de-locked by the pressure in the respectively other line are positioned in the connecting lines between the pumping unit of the pressure supply unit and the working chambers of working cylinder.

9. The pressure supply unit as claimed in claim 2, wherein each of said pressure on-off valves has a switching point that can be set independently.

* * * * *